(12) United States Patent
Shimazaki et al.

(10) Patent No.: US 7,662,734 B2
(45) Date of Patent: Feb. 16, 2010

(54) WOVEN BELT AND SEAT BELT APPARATUS

(75) Inventors: Sadayuki Shimazaki, Tokyo (JP); Itsuo Tabayashi, Tokyo (JP)

(73) Assignee: Takata Corporation, Tokyo (JP)

( * ) Notice: Subject to any disclaimer, the term of this patent is extended or adjusted under 35 U.S.C. 154(b) by 9 days.

(21) Appl. No.: 11/992,730

(22) PCT Filed: Nov. 22, 2006

(86) PCT No.: PCT/JP2006/323356

§ 371 (c)(1),
(2), (4) Date: Mar. 28, 2008

(87) PCT Pub. No.: WO2007/061010

PCT Pub. Date: May 31, 2007

(65) Prior Publication Data

US 2009/0134690 A1     May 28, 2009

(30) Foreign Application Priority Data

Nov. 28, 2005    (JP)    ............... 2005-342631

(51) Int. Cl.
*D03D 15/00*    (2006.01)

(52) U.S. Cl. ...................... 442/199; 280/803

(58) Field of Classification Search .................. None
See application file for complete search history.

(56) References Cited

U.S. PATENT DOCUMENTS

| | | | | |
|---|---|---|---|---|
| 5,298,321 | A * | 3/1994 | Isoda et al. ............... | 442/359 |
| 5,713,601 | A | 2/1998 | Bonigk | |
| 2006/0005913 | A1 | 1/2006 | Berger | |
| 2006/0016546 | A1 | 1/2006 | Berger | |

FOREIGN PATENT DOCUMENTS

| | | |
|---|---|---|
| JP | 2-46881 | 3/1990 |
| JP | 7-207582 | 8/1995 |
| JP | 07-309200 | 11/1995 |
| JP | 08-72668 | 3/1996 |
| JP | 9-31850 | 2/1997 |
| JP | 9-109828 | 4/1997 |
| JP | 9-323619 | 12/1997 |
| JP | 10-121323 | 5/1998 |
| JP | 2001-234233 | 8/2000 |
| JP | 2000-248469 | 9/2000 |
| JP | 2001-106023 | 4/2001 |
| JP | 2001-234477 | 8/2001 |

(Continued)

*Primary Examiner*—Arti Singh-Pandey
(74) *Attorney, Agent, or Firm*—Foley & Lardner LLP

(57) ABSTRACT

In a woven belt and a seat belt apparatus using the same, it is an object to improve the abrasion resistance thereof. A woven belt 101 is made by weaving warp thread 102 extending in substantially the longitudinal direction of webbing and weft thread 103 extending in substantially the width direction of the webbing. Employed as at least either of the warp thread 102 and the weft thread 103 is fiber bundle containing thermal adhesion yarns (for example, each comprising a low melting point filament component 206 having a relatively low melting point and a high melting point filament component 207 having a relatively high melting point), thereby improving the strength of the fiber bundle and thus improving the entire abrasion resistance of the woven belt 101.

8 Claims, 9 Drawing Sheets

FOREIGN PATENT DOCUMENTS

| | | |
|---|---|---|
| JP | 2001-294122 | 10/2001 |
| JP | 2001-295153 | 10/2001 |
| JP | 2002-029372 | 1/2002 |
| JP | 2002-240680 | 8/2002 |
| JP | 2002-362304 | 12/2002 |
| JP | 2004-315984 | 11/2004 |
| WO | WO 00/20672 | 4/2000 |
| WO | WO 2004/048658 A1 | 6/2004 |
| WO | WO 2006/088163 A1 | 8/2006 |

* cited by examiner

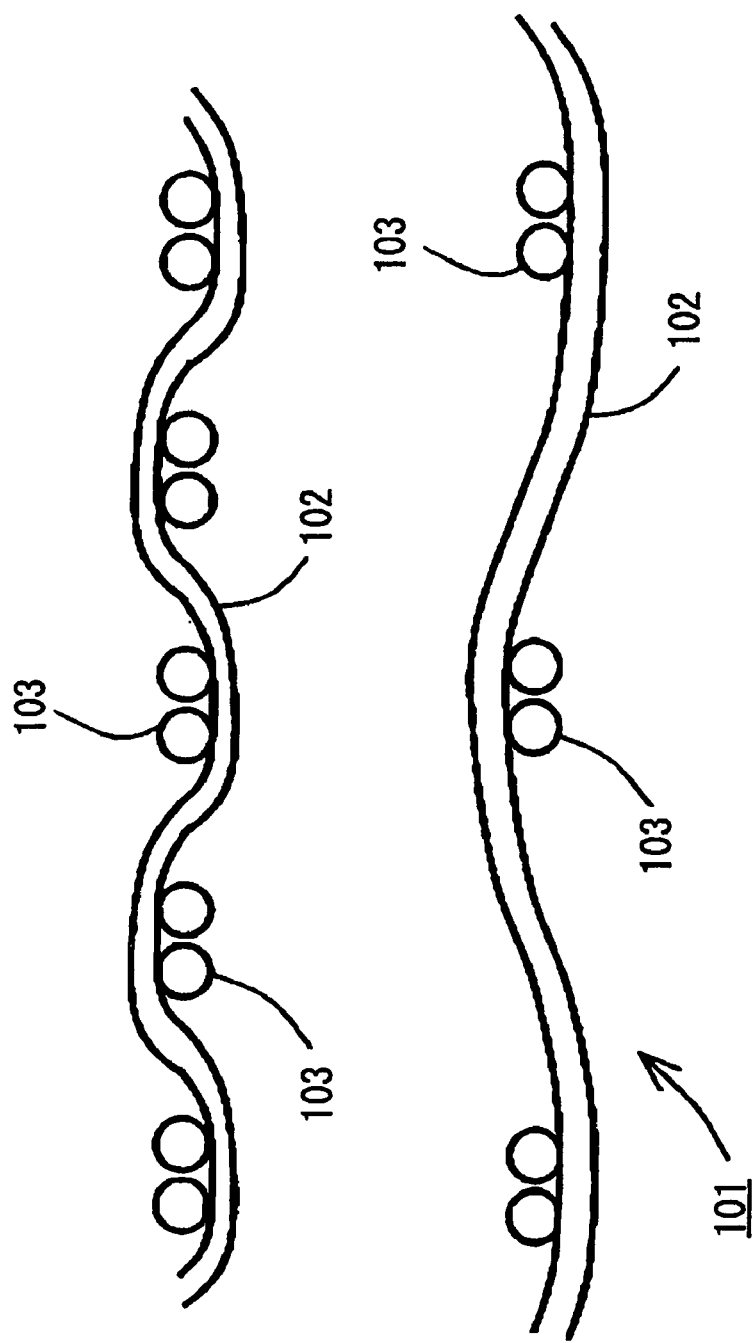

WOVEN BELT AND SEAT BELT APPARATUS

TECHNICAL FIELD

The present invention relates to a woven belt which is made by weaving a plurality of fiber bundles, which are substantially perpendicular to each other, into a band shape and, more particularly, to a woven belt having high load bearing capacity and a seat belt apparatus using the same as a webbing thereof.

BACKGROUND ART

Conventionally, woven belt which is made by weaving high strength fibers has been frequently used as a band for restraining heavy goods or for bundling a plurality of materials. A well known example of use of such a woven belt is a webbing of a seat belt apparatus for restraining the body of an occupant in a seat of a vehicle or the like.

The webbing of the seat belt apparatus is required to have not only basic performance such as load bearing characteristic capable of restraining the body of the occupant in the event of a vehicle collision but also various performances such as comfort during wearing thereof and easiness of withdrawing the webbing from a retractor which is a retractor device of the webbing. Therefore, various technologies have been proposed for improving fibers used for a woven belt and the weaving structure of the fibers (for example, see Patent document 1).

Patent document 1: JP-A-2004-315984

DISCLOSURE OF INVENTION

Problems to be Solved by the Invention

By its very nature, woven belt is generally is used repeatedly not single-use. For example, in the aforementioned case of the seat belt apparatus, the woven belt is put on after the occupant gets on the vehicle and the woven belt is put off before the occupant gets out of the vehicle. Also in case that the woven belt is used for carrying materials and for heavy goods, the woven belt is taken off after used to restrain or bundle the objects and is again put on for the next time of using.

According to the nature of the woven belt which is repeatedly put on and off and on which a large tension is applied when used, the woven belt is desired to have a abrasion resistance as large as possible.

The object of the present invention is to provide a woven belt which can have improved abrasion resistance and a seat belt apparatus using the same.

Means for Solving the Problems

For achieving the object, the first invention is a woven belt which is made by weaving first fiber bundle(s) extending in substantially the longitudinal direction of webbing and second fiber bundle(s) extending in substantially the width direction of the webbing, wherein at least either of the first fiber bundle and the second fiber bundle is fiber bundle containing thermal adhesive yarns.

When the thermal adhesive yarns having a characteristic capable being welded by heating are used in the first fiber bundle or the second fiber bundle, the first fiber bundle or the second fiber bundle is welded and strongly bonded to the other fiber bundle by heating, thereby improving the strength. As a result, improved abrasion resistance is obtained.

The second invention is the same woven belt as the aforementioned first invention and is characterized in that the first fiber bundle is fiber bundle containing a normal synthetic fiber yarn and the second fiber bundle is the fiber bundle containing a thermal adhesive yarn.

The first fiber bundle is fiber bundle of normal synthetic fiber yarns, while the second fiber bundle uses the thermal adhesive yarns so as to increase the strength of the fiber bundle. Accordingly, the strength can be improved as compared to the case that the both fiber bundles are normal fiber bundles, thereby improving the abrasion resistance.

The third invention is the woven belt as the aforementioned first or second invention and is characterized in that the thermal adhesive yarn comprises a low melting point filament component having a relatively low melting point and a high melting point filament component having a relatively high melting point.

The low melting point filament component is melted by heating and is thus welded and strongly bonded to the other fiber bundle (the second fiber bundle or the first fiber bundle), thereby improving the strength.

The fourth invention is the same woven belt as the third invention and is characterized in that the low melting point filament component is arranged in a peripheral portion of the thermal adhesive yarn.

The low melting point filament component arranged in the peripheral portion is welded and strongly bonded to other single yarns or fiber bundles by heating process, thereby improving the strength.

The fifth invention is the same woven belt as the third or fourth invention and is characterized in that the melting point of the high melting point filament component is in a range of from 250° C. to 260° C. and the melting point of the low melting point filament component is in a range of from 160° C. to less than 250° C.

Accordingly, by curing, for example, at a temperature of from 150° C. to 230° C. for a time period of from 300 seconds to 180 seconds, the low melting point filament component can be melted without loosing the strength of the high melting point filament component, that is, the bonding function by welding can be obtained.

The sixth invention is the same woven belt as one of the aforementioned first through fifth inventions and is characterized in that the thread count of one of the first fiber bundle and the second fiber bundle per 1 inch relative to the other fiber bundle is set to 20 or less.

By setting the thread count of one of the fiber bundles to 20 or less, the curves of the serpentine configuration of the other fiber bundle when woven becomes gentle so that the stress concentration on the curves can be reduced, thereby also improving the strength.

The seventh invention is the same woven belt as one of the first through sixth invention and is characterized in that at least one of the first fiber bundle and the second fiber bundle is fiber bundle of non-twisted yarns provided with interlaced portions.

The first fiber bundle or the second fiber bundle contains the thermal adhesion yarn and is further provided with the interlaced portions so as to ensure the strength and the abrasion resistance even though non-twisted yarns not expensive twisted yarns are employed. Therefore, the manufacturing cost can be reduced.

The eighth invention comprises: a woven belt for restraining an occupant; a retractor device capable of winding the woven belt; a buckle which is connected to a fixed side member; and a tongue which is attached to the woven belt and is latched with the buckle, wherein the woven belt is made by weaving first fiber bundle(s) extending in substantially the longitudinal direction of webbing and second fiber bundle(s) extending in substantially the width direction of the webbing, wherein at least either of the first fiber bundle and the second fiber bundle is fiber bundle containing thermal adhesive yarns.

In the seat belt apparatus of the eighth invention, the thermal adhesive yarns having a characteristic capable being welded by heating is used in the first fiber bundle or the second fiber bundle of the woven belt. The thermal adhesive yarns in the first fiber bundle or the second fiber bundle are welded and strongly bonded to the other fiber bundle (the second fiber bundle or the first fiber bundle) by heating, thereby improving the strength and thus improving the abrasion resistance.

Effect of the Invention

The present invention provides a woven belt and a seat belt apparatus using the same, in which the strength of the woven belt is improved and the abrasion resistance is thus improved.

BEST MODE FOR CARRYING OUT THE INVENTION

Hereinafter, embodiments of the present invention will be described with reference to drawings. Following description will be made as regard to a case that the woven belt of the present invention is applied to a webbing of a seat belt apparatus. One embodiment about the entire structure of the seat belt apparatus which can be commonly used and examples of woven belts as webbings which can be used in the seat belt apparatus will be described.

Embodiment of Seat Belt Apparatus

First, an embodiment of a seat belt apparatus which can employ the woven belt will be described. FIG. 1 is a front view showing the entire structure of a seat belt apparatus according to an embodiment of the present invention with an occupant.

Referring to FIG. 1, a seat belt apparatus 1 comprises a seat belt 2 as a webbing, a retractor device 3 for winding up one side of the seat belt 2 in such a manner as to allow the withdrawal of the seat belt 2, a tongue 4 which is slidably attached to the seat belt 2, and a buckle device 5 which can be latched with the tongue 4.

The seat belt 2 is composed of a woven belt as a webbing in which a warp thread (first fiber bundle) extending substantially in the longitudinal direction thereof and a weft thread (second fiber bundle) extending substantially in the width direction thereof are woven. As mentioned above, the one side of the seat belt 2 is wound by the retractor device 3, the middle portion of the seat belt 2 is inserted through a deflection fitting 6, and the other side end of the seat belt 2 is pivotally connected to a vehicle body 8 by an anchor plate 7.

FIG. 2 is a vertical sectional view showing an example of the entire schematic structure of the retractor device 3.

Referring to FIG. 2, the retractor device 3 comprises a frame 9, a spool 10 onto which the seat belt 2 is wound, a torsion bar 11 made of torsionally deformable material, a deceleration sensing means 12 which senses a large vehicle deceleration generated in the event of an emergency and is thus actuated, a locking mechanism 13 which blocks at least the rotation of the spool 10 in the belt withdrawing direction, a spring means 14 having a spiral spring, a pretensioner 15 which is actuated in the event of an emergency to generate belt winding torque, and a bush 16 for transmitting the belt winding torque of the pretensioner 15 to the spool 10.

The locking mechanism 13 comprises a locking base 18 which holds a pawl 17 to allow the rocking action of the pawl 17, and a lock gear 19. The lock gear 19 may have the same structure as a heretofore known lock gear so that illustration of details of the structure is omitted. Though the lock gear 19 normally rotates together with the torsion bar 11, the lock gear 19 is stopped by the actuation of the deceleration sensing means 12 so as to generate a rotational difference relative to the torsion bar 11 in the event of an emergency, thereby engaging the pawl 17 to inner teeth 20 formed in a side wall of the frame 9. As a result, the rotation of the locking base 18 (i.e. the spool 10) in the seat belt withdrawing direction is blocked. Also when the seat belt 2 is rapidly withdrawn, the locking base 18 of the locking mechanism 13 rotates in the seat belt withdrawing direction relative to the lock gear 19, thereby blocking the withdrawal of the seat belt 2 in the same manner as the above, but the detailed illustration of this operation is omitted.

The torsion bar 11 is fitted in the inner side (more precisely, the center side in the radial direction) of the spool 10 with some looseness to extend in the axial direction. The torsion bar 11 comprises a torque transmitting section 21 which is located at one side (the left side in FIG. 2) of the axial direction and is engaged with the other side portion in the axial direction of the spool 10 not to allow the relative rotation thereof, and a torque transmission section 22 which is located at the other side (the right side in FIG. 2) in the axial direction and is engaged with the locking base 18 not to allow the relative rotation thereof (that is, which is supported on the locking base 18 such that the torque transmission section 22 rotates together with the locking base 18). The torsion bar 11 serves as a function of rotationally connecting the spool 10 and the locking mechanism 13.

The spool 10 comprises a cylindrical body portion 10a onto which the seat belt 2 is wound, and a large-diameter cylindrical portion 10b having an outer diameter larger than that of the cylindrical body portion 10a. The spool 10 is rotatably supported between the side walls of the frame 9. The spool 10 is always biased in the seat belt winding direction by the biasing force of the spiral spring of the spring means 14 through a bush 23, the torsion bar 11, the second torque transmitting section 21 of the torsion bar 11, and a bush 16. As a result of this arrangement, the one side (the left side in FIG. 2) of the torsion bar 11 in the axial direction is connected to the spool 10 in such a manner as to allow the rotation together with the spool 10. When the pretensioner 15 is actuated, the belt winding torque generated by the pretensioner 15 is transmitted to the spool 10 through the bush 16, whereby the spool 10 winds up a predetermined amount of the seat belt 2.

Disposed between the spool 10 and a shaft portion 18a of the locking base 18 is an annular relative rotation locking member 24. The relative rotation locking member 24 has an internal thread (not shown) which is formed in the inner surface thereof. The internal thread engages with an external thread (not shown) which is formed in the shaft portion 18a of the locking base 18. In addition, the relative rotation locking member 24 is fitted into an axial hole of the spool 10 such that the relative rotation locking member 24 can not rotate relative to the spool 10 and can move in the axial direction. As the spool 10 rotates in the belt withdrawing direction relative to the locking base 18, the relative rotation locking member 24 rotates together with the spool 10 and moves in a direction toward the right in FIG. 2.

Referring back to FIG. 1, in the seat belt apparatus 1 having the aforementioned basic structure, an occupant 25 withdraws the seat belt 2 from the retractor device 3 against the winding force thereof and latches the tongue 4, attached to the seat belt 2, to the buckle device 5, thereby wearing the seat belt 2. The state that the seat belt 2 is worn is shown by dashed-dotted lines in FIG. 1. Thus, the seat belt 2 extends across two regions, i.e. the chest region and the lower abdominal region of the occupant 25. As a result of this, the occupant 25 is restrained in a seat 26.

The most characterized point of the seat belt apparatus having the aforementioned structure is using a fiber bundle containing thermal adhesion yarns as at least either of the warp thread and the weft thread composing the seat belt 2 (webbing), i.e. the woven belt.

When thermal adhesion yarns having such a characteristic that it is welded when heated are used in the warp thread or the weft thread, the thermal adhesion yarns are welded to and thus strongly bonded to the other thread (the warp thread or the weft thread) by the heating process, thereby improving the strength (as will be described later). In the seat belt apparatus of this embodiment, the thermal adhesion yarns as mentioned above are used, thereby improving the strength of the fiber bundles of the woven belt and improving the abrasion resistance.

Hereinafter, an embodiment of the woven belt of the present invention containing the thermal adhesion yarns in the weft thread will be described in detail.

FIG. 3 is an external view of a woven belt of this embodiment, and FIG. 4 is an enlarged side view of the woven belt of this embodiment. Referring to FIG. 3, the woven belt 101 according to this embodiment is a band-like cloth which is long in the vertical direction of this drawing. The woven belt 101 shown in this drawing is in a state without parts such as the tongue at it end.

As shown in FIG. 4, the woven belt 101 is made by weaving a plurality of warp threads 102 extending substantially in the longitudinal direction and a weft thread 103 (hatched portions in this drawing) extending substantially in the width direction. The weft thread is arranged to reciprocate in the width direction of the woven belt 101 to extend substantially straight. The plurality of warp threads 102 are arranged to intersect with and enter between parallel lines of the weft thread 103 alternately so that the warp threads 102 extend in serpentine configuration.

The warp thread 102 and the weft thread 103 are each composed of a fiber bundle which is made by bundling a plurality of single yarns 104 (filament, single yarn of minimum unit). The warp thread 102 is made of normal synthetic fiber. A typical example of the synthetic fiber is a polymer of polyethylene terephthalate which is manufactured by esterification of terephthalic acid and ethylene glycol. On the other hand, the weft thread 103 contains thermal adhesion yarns. These are non-twisted yarns which were interlaced at regular intervals and thus gathered.

FIGS. 5(a)-5(c) are illustrations showing examples of sectional structures of the aforementioned weft thread 103 for the woven belt of this embodiment.

In any of these examples shown in FIG. 5(a), FIG. 5(b), and FIG. 5(c), the weft thread 103 is a non-twisted fiber bundle composed of a plurality of single yarns of which one third are thermal adhesion yarns 204 and the others are normal synthetic yarns 205.

In the example of FIG. 5(a), the thermal adhesion yarns 204 are arranged to huddle to one side (the right side in the drawing) and the normal synthetic yarns 205 are arranged to huddle to the other side (the left side in the drawing) in the sectional structure of the weft thread 103.

In the example of FIG. 5(b), the thermal adhesion yarns 204 are arranged to huddle to substantially the center in the lateral direction in the drawing and the normal synthetic yarns 205 are arranged to huddle equally to the both sides (the left side and the right side in the drawing) of the thermal adhesion yarns 204 in the sectional structure of the weft thread 103. This example is an example which is spun not to generate bias (unevenness) in the lateral direction in the drawing of the example shown in FIG. 5(a).

In the example of FIG. 5(c), the thermal adhesion yarns 204 are arranged to huddle in the center both in the vertical direction and the lateral direction in the drawing and the normal synthetic yarns 205 are arranged to huddle equally to the peripheral side (outer side) of the thermal adhesion yarns 204 in the sectional structure of the weft thread 103. This example is an example, further improved from the example shown in FIG. 5(b), which is spun not to generate bias (unevenness) not only in the lateral direction, but also in the vertical direction.

FIG. 6 is an explanatory illustration as a perspective view schematically showing an example of detailed configuration of a bundle of the thermal adhesion yarns 204.

Referring to FIG. 6, each of the thermal adhesion yarns 204 is typically structured to have a double layered form in which the entire outer surface of a high melting point filament component 207 having a relatively high melting point is covered and surrounded by a low melting point filament component 206 as a sheath having a relatively low melting point as shown in FIG. 6. The high melting point filament component 207 is made of, for example, polyethylene terephthalate and the low melting point filament component 206 is made of, for example, copolymer of polyethylene isophthalate with the aforementioned polyethylene terephthalate (manufactured by esterification of terephthalic acid, isophthalic acid, and ethylene glycol).

In this embodiment, a fiber bundle which is made by bundling the thermal adhesion yarns 204 (monofilaments), i.e. a multifilament is partially used in the weft thread. As the woven belt 101 manufactured using the weft thread as mentioned above is heated, the copolymer of polyethylene isophthalate with polyethylene terephthalate composing the low melting point filament components in the thermal adhesion yarns 204 is melted so that the adjacent monofilaments and the adjacent multifilaments are welded to each other, thereby increasing the overall stiffness of the woven belt 101.

In the thermal adhesion yarn 204, the higher the ratio, i.e. the larger the amount, of polyethylene isophthalate in the copolymer of the low melting filament component 206, the lower the melting point of the low melting filament component 206 is. For example, when the ratio of polyethylene isophthalate in the copolymer is 10% (the ratio of the polyethylene terephthalate is 90%), the obtained thermal adhesion yarn has a melting point of 230° C. When the ratio of polyethylene isophthalate in the copolymer is 30% (the ratio of the polyethylene terephthalate is 70%), the obtained thermal adhesion yarn has a melting point of 160° C. In this embodiment, the thermal adhesion yarn in which the ratio of polyethylene isophthalate in the copolymer is 30% and which has a melting point of 160° C. is employed.

FIG. 7 is a flow chart showing procedures of heating process (heat setting process) of the aforementioned thermal adhesion yarns 204. After the weft thread 103 having the aforementioned structure and the warp thread 102 are woven (step S10) and processed by a predetermined dip dyeing (step S20) and drying (step S30), it is cured, for example, at a temperature of 200° C. for 200 seconds, thereby melting only the low melting point filament components 206 at the same time as the dyeing process (step S40). As a result, in the weft thread 103, the thermal adhesion yarns 204 are welded to each other or to the normal synthetic yarns 205 or further to the corresponding warp thread 102 (see FIG. 5). After that, it is cooled to a predetermined temperature (step S50), is cut into a predetermined size (step S60), and is then packed (step S70). In this manner, the procedures are terminated. As mentioned above, since the fiber bundle contains the thermal adhesive yarns 204 having a characteristic capable being welded by heating, the thermal adhesive yarns 204 are welded and strongly bonded to the fiber bundle of the corresponding yarns by heating, thereby improving the strength.

On the other hand, non-twisted yarn will be described. FIG. 8(a) is an enlarged illustration showing a part of the weft thread 103 indicated by a broken line in FIG. 8(b). FIG. 8(b) is an illustration showing a portion where the weft thread 103 and the warp thread 102 cross each other. Because the interlaced portions 105 where yarns are snarled as shown in FIG. 8(a) are provided at predetermined intervals, the single yarns 104 are not separated from each other so as to maintain the state of the fiber bundle. The interval for providing the interlaced portions 105 may be suitably set depending on the thickness and the number of single yarns. Also in the warp thread 102, similarly to the weft thread 103, interlaced portions where yarns are snarled are provided at predetermined intervals, but its enlarged illustration is omitted. By employing the aforementioned non-twisted yarn, a fiber bundle of which manufacturing cost is reduced because the twisting process is not required and having improved strength and improved abrasion resistance can be obtained.

As described in the above, according to the woven belt 101 of this embodiment, the strength of the fiber bundle is improved by employing the thermal adhesion yarns 204 in the weft thread 103 as mentioned above, thereby improving the abrasion resistance. Especially by setting the thread count of one of the weft thread 103 and the warp thread 102 per 1 inch relative to the other to 20 or less, the curves of the serpentine configuration of the other fiber bundles when woven becomes gentle so that the stress concentration on the curves can be reduced, thereby also improving the strength.

Especially in this embodiment, the weft thread 103 contains the thermal adhesion yarns 204 and is further provided with the interlaced portions 105 so as to ensure the strength and the abrasion resistance even though non-twisted yarns not expensive twisted yarns are used. Therefore, the manufacturing cost can be reduced.

Especially in this embodiment, the thermal adhesive yarn 204 is provided around its periphery with the low melting point filament component 206. The low melting point filament component 206 is welded and strongly bonded to the other single yarns or fiber bundles, thereby improving the strength.

By applying the increase in strength and increase in abrasion resistance as mentioned above, the number of the fiber bundles as the weft thread 103 or warp thread 102 can be reduced while maintaining the strength of the woven belt 101 to the normal level. For instance, to ensure the strength of the woven belt, usually the entire density of the woven belt must be increased by increasing the count of the weft thread 103 and narrowing the interval for insertion of the weft thread 103 as shown in FIG. 9(a). However, even though a woven belt has a reduced count of the weft thread 103 and widened interval for insertion as shown in FIG. 9(b) and a reduced count of warp threads, it is possible to ensure the strength of the woven belt 101 of normal level. Therefore, the entire weight of the woven belt 101 can be reduced for the reduced number of fiber bundles without decreasing the strength.

When the thread count of fiber bundle as one of the weft thread 103 and the warp thread 102 per 1 inch relative to the other fiber bundle is set to 20 or less in this application example, the stress concentration on the curves can be reduced as mentioned above, thereby improving the strength. In addition, even when the thread count of the fiber bundle as the warp thread 102 is reduced for obtaining greater lightweight effect, the strength of the warp thread 102 can be maintained by reducing the thread count of the weft thread 103. The reduction in stiffness of the webbing in the width direction due to the reduction in thread count of the weft thread 103 can be compensated to the normal level by including the thermal adhesion yarns 204 in the weft thread 103. In case that the woven belt is applied to a seat belt apparatus, the twisting, reversal, and jam of the belt can be prevented, thereby exhibiting the effect of improving the easiness of withdrawing.

The respective melting points of the filament components 206 and 207 are not limited to the aforementioned values. The melting point of the high melting point filament component 207 is suitably in a range of from 250° C. to 260° C. and the melting point of the low melting point filament component 206 is suitably in a range of from 160° C. to less than 250° C. Accordingly, by curing, for example, at a temperature of from 150° C. to 230° C. for a time period of from 300 seconds to 180 seconds, the low melting point filament component 206 can be melted without loosing the strength of the high melting point filament component 207, that is, the bonding effect by welding can be obtained.

Especially in the embodiment, the increase in strength of fiber bundles is achieved by employing the thermal adhesion yarns 204 in the weft thread 103 while employing the fiber bundle of normal synthetic fiber yarns as the warp thread 102. The strength can be improved as compared to the case that the weft thread and warp thread are both normal fiber bundles.

According to the weaving structure, the weft thread 103 as the second fiber bundle may be fiber bundle of normal synthetic fiber yarns and the warp thread 102 as the first fiber bundle may contain the thermal adhesive yarns 204. Further, the thermal adhesive yarns 204 may be employed both in the weft thread 103 and the warp thread 102. Alternatively, the weft thread 103 and the warp thread 102 may partially contain the thermal adhesive yarns 204, respectively. As for the non twisted yarn, both or either of the warp thread 102 and the weft thread 103 may be twisted yarn.

Now, the description of the embodiments of the woven belt and the seat belt apparatus of the present invention is terminated. The concrete structures of the aforementioned embodiments are not intended to strictly limit the subject matters of the present invention and the details may be altered variously without departing from the scope of the invention. Especially though the aforementioned embodiments have been described about examples in which the woven belt is used as a webbing of a seat belt apparatus in a vehicle, the application of the woven belt of the present invention is not limited thereto. The woven belt of the present invention can be suitably applied to general-purpose belts for hanging or carrying something, for example a belt for restraining together heavy goods such as building materials and a body restraining member such as a safety belt or a harness.

BRIEF DESCRIPTION OF THE DRAWINGS

FIG. 9(a) is a side sectional view showing the weaving structure of a normal woven belt and FIG. 9(b) is a side sectional view showing the weaving structure of the woven belt of the embodiment.

Figure 1:
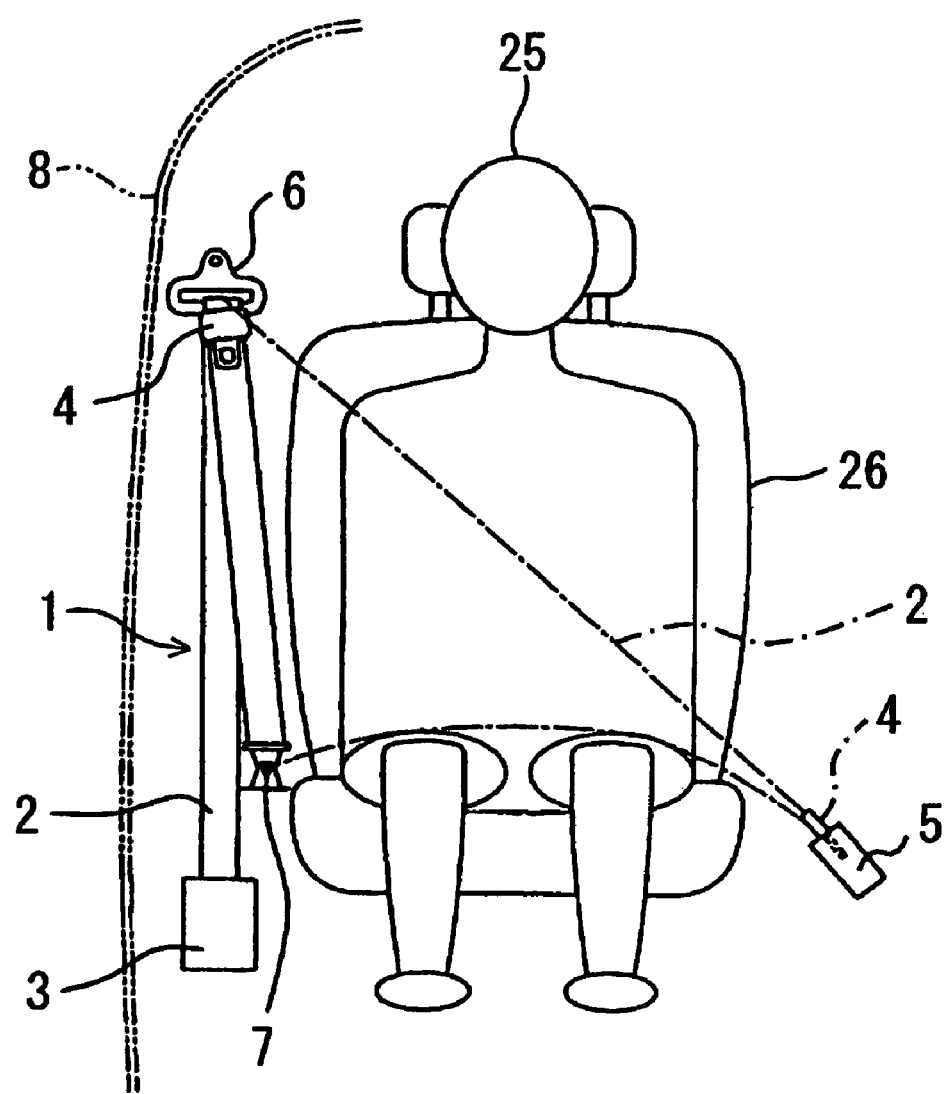
FIG. 1 is a front view showing the entire structure of a seat belt apparatus according to an embodiment of the present invention with an occupant.
Figure 2:
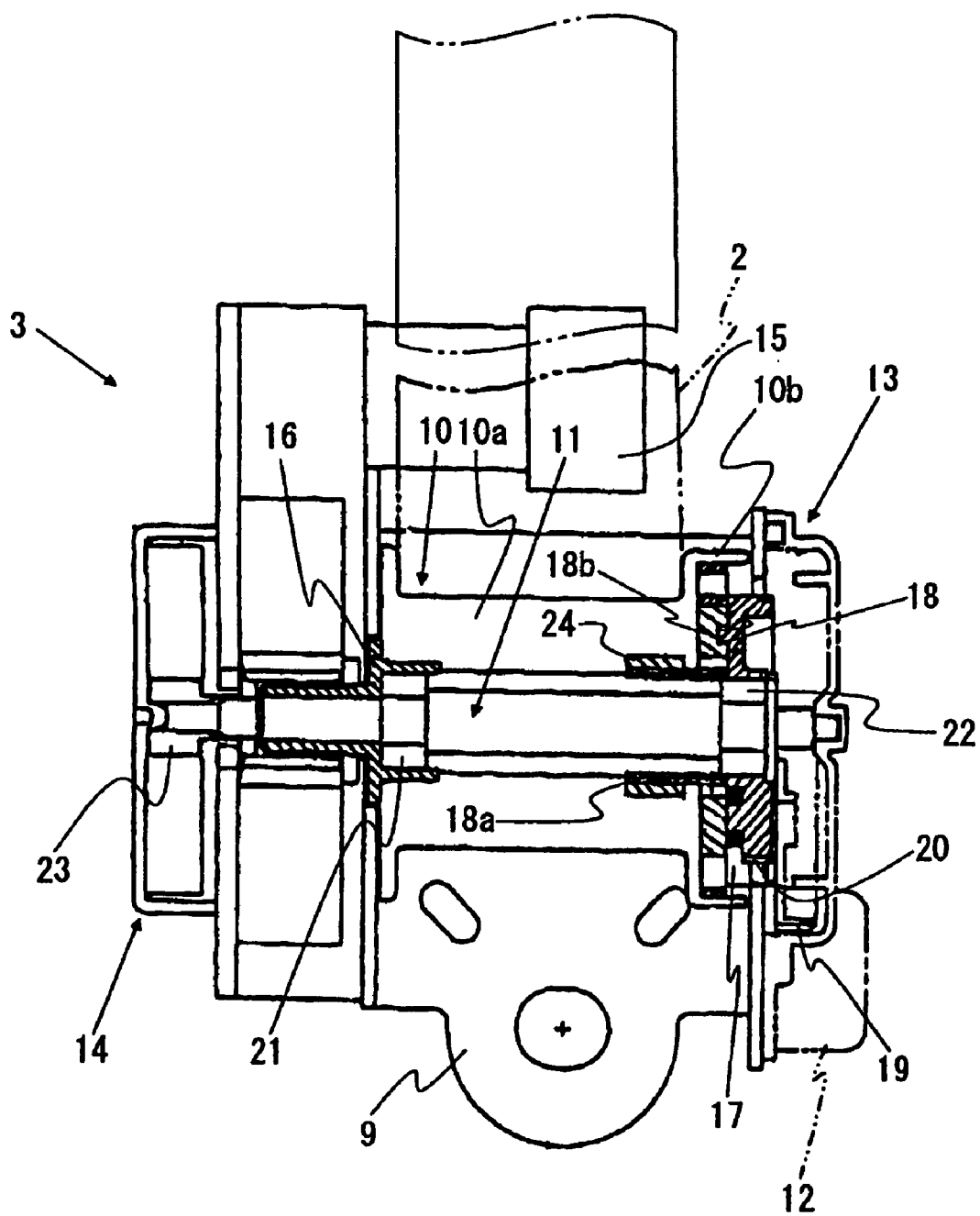
FIG. 2 is a vertical sectional view showing an example of the entire schematic structure of a retractor device of the seat belt apparatus.
Figure 3:
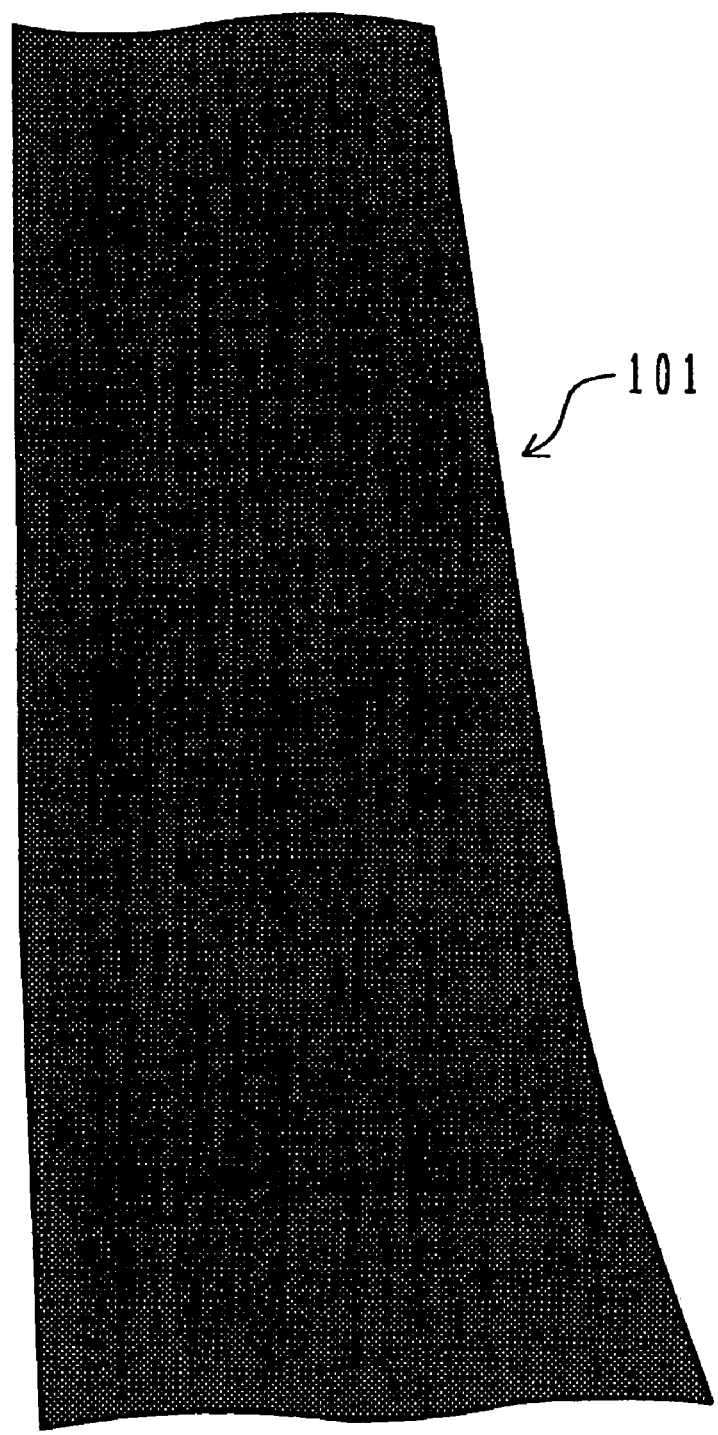
FIG. 3 is an external view of a woven belt of an embodiment of the present invention.
Figure 4:
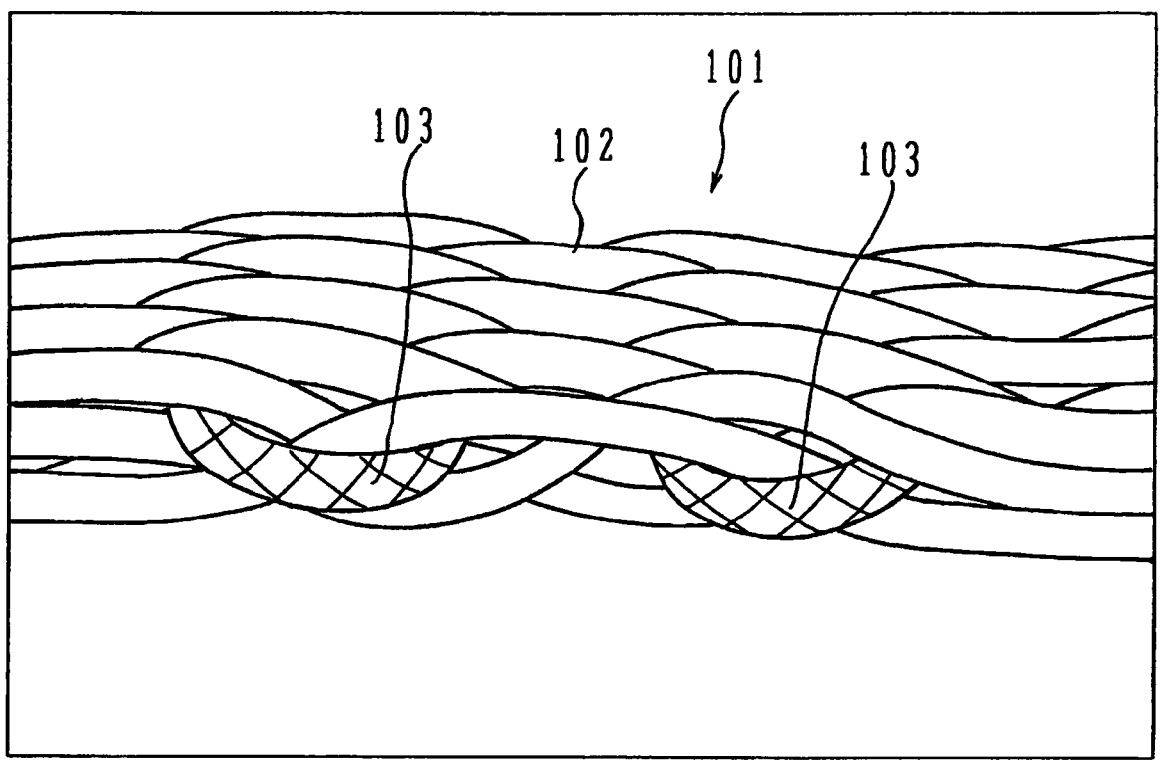
FIG. 4 is an enlarged side view of the woven belt of the embodiment.
Figure 5A:
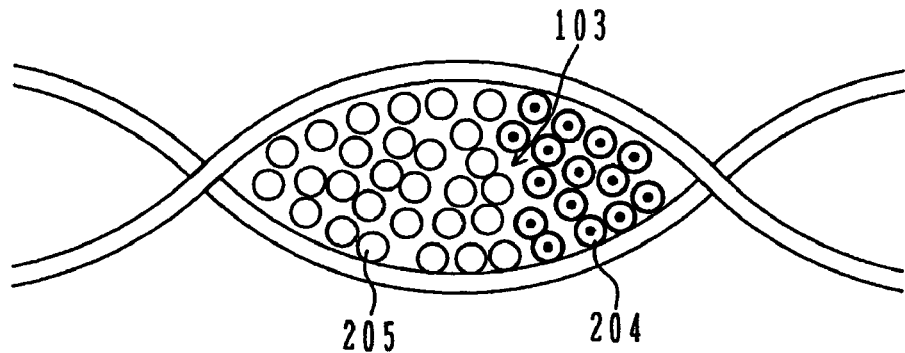
FIGS. 5(a)-5(c) are illustrations showing examples of sectional structures of a weft thread for the woven belt of the embodiment.
Figure 5B:
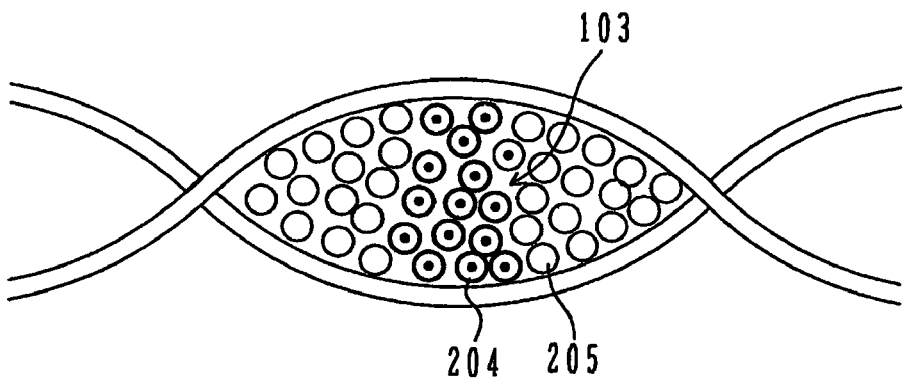
Figure 5C:
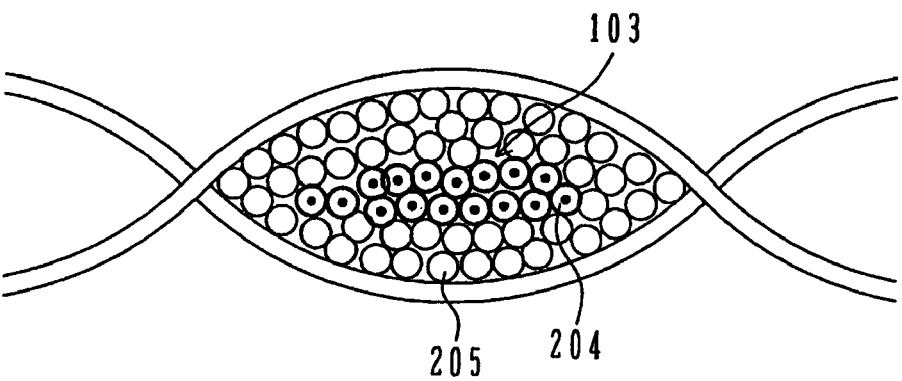
Figure 6:
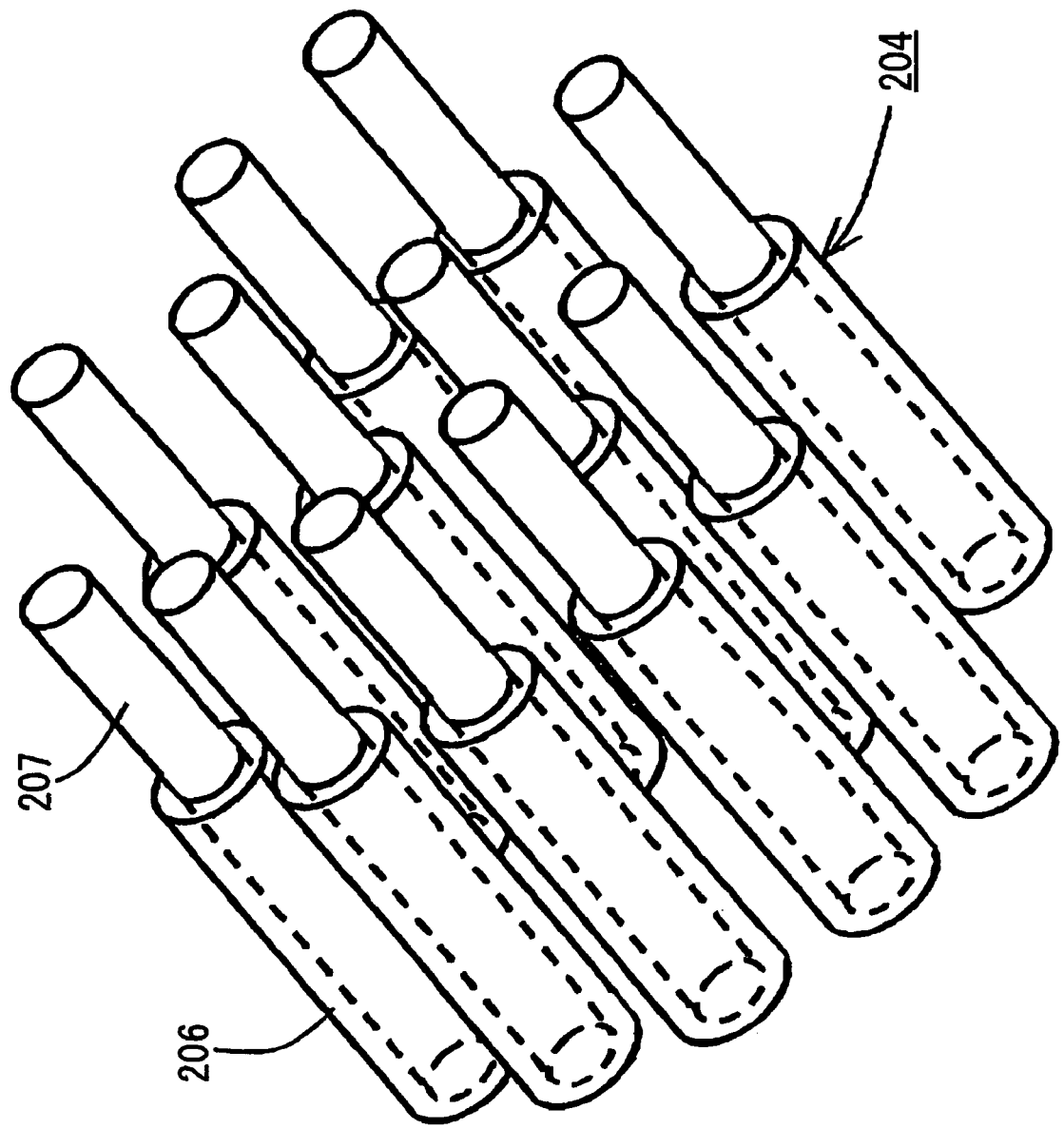
FIG. 6 is a perspective view schematically showing a section of a bundle of thermal adhesion yarns used in the weft thread of the woven belt.
Figure 7:
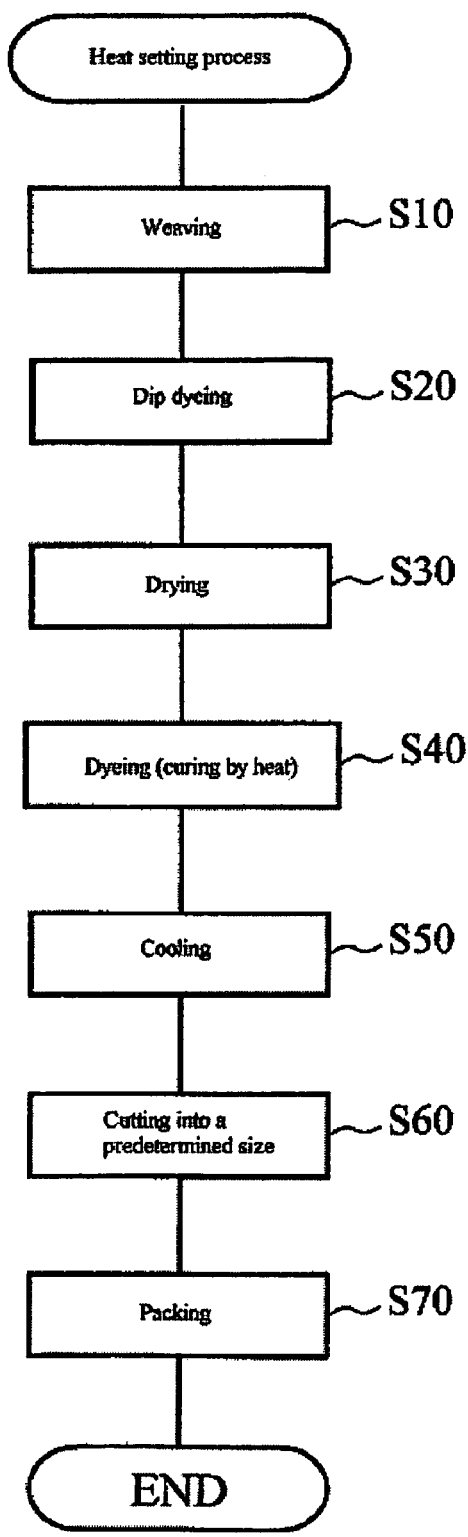
FIG. 7 is a flow chart showing procedures of heating process (heat setting process) of the thermal adhesion yarns.
Figures 8A, 8B:
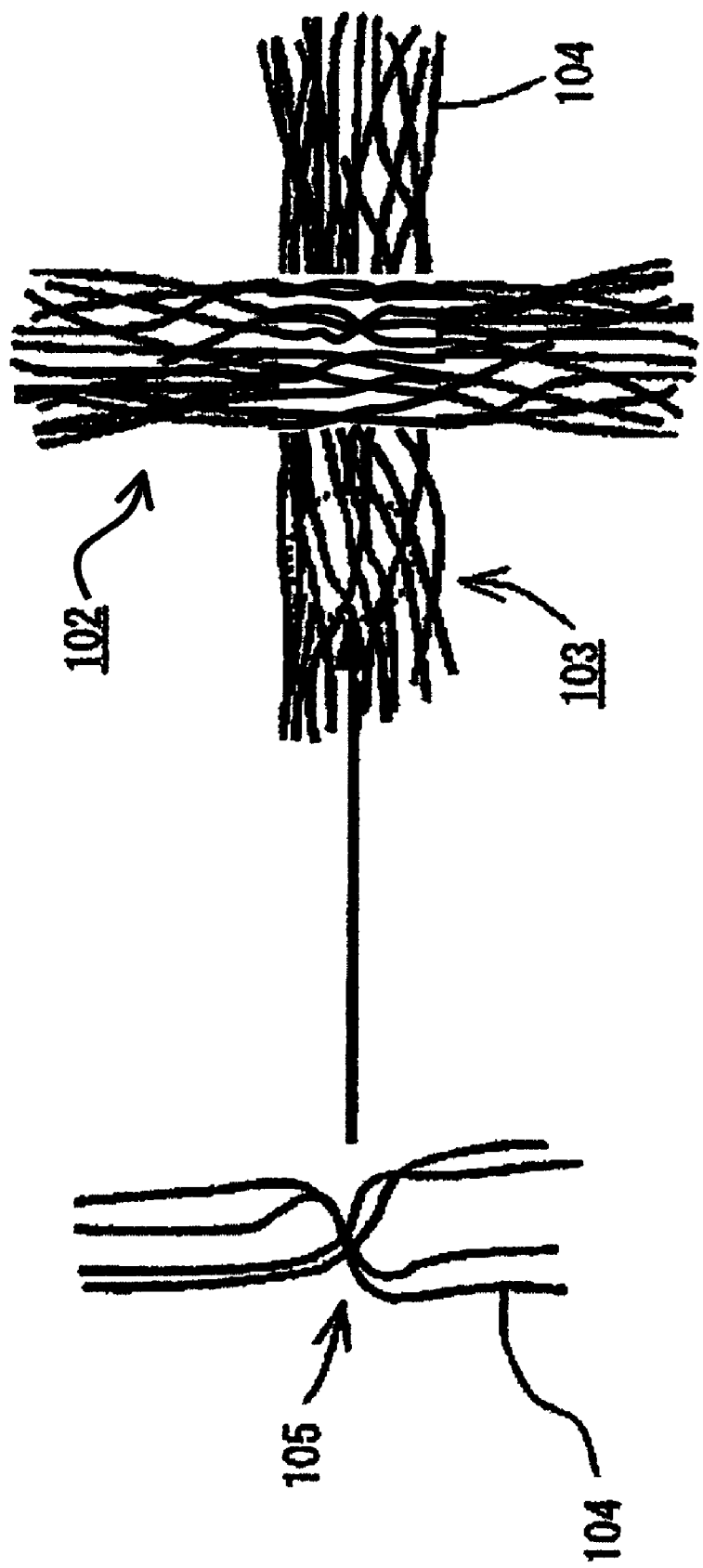
FIG. 8(a) is an enlarged illustration showing a part of the weft thread of non-twisted yarn circled by a broken line in FIG. 8(b) and FIG. 8(b) is an illustration showing a portion where the weft thread and the warp thread cross each other.

| EXPLANATION OF REFERENCE SIGNS IN DRAWINGS |   |
|---|---|
| 1 | seat belt apparatus |
| 2 | seat belt |
| 3 | retractor device |
| 4 | tongue |
| 5 | buckle device |
| 101 | woven belt |
| 102 | warp thread (first fiber bundle) |
| 103 | weft thread (second fiber bundle) |
| 104 | single yarn |
| 105 | interlaced portion |
| 204 | thermal adhesion yarn |
| 206 | low melting point filament component |
| 207 | high melting point filament component |

What is claimed is:

1. A woven belt which is made by weaving first fiber bundle(s) extending in one of substantially a longitudinal direction or a width direction of a webbing and second fiber bundle(s) extending in the other of substantially the longitudinal direction or the width direction of the webbing, wherein:
   the first fiber bundle contains a plurality of single yarns, the plurality of single yarns comprises a plurality of thermal adhesive yarns and a plurality of normal synthetic yarns, and
   wherein the plurality of thermal adhesive yarns are arranged to huddle to substantially a center of the first fiber bundle so that the plurality of normal synthetic yarns are positioned on opposite sides of the huddle of the plurality of thermal adhesive yarns.

2. A woven belt as claimed in claim 1, wherein said second fiber bundle contains normal synthetic yarns and/or thermal adhesive yarns.

3. A woven belt as claimed in claim 1, wherein:
   Said each thermal adhesive yarn comprises a low melting point filament component having a relatively low melting point and a high melting point filament component having a relatively high melting point.

4. A woven belt as claimed in claim 3, wherein said low melting point filament component is arranged in a peripheral portion of said thermal adhesive yarn.

5. A woven belt as claimed in claim 3, wherein:
   the melting point of said high melting point filament component is in a range of from 250° C. to 260° C. and the melting point of said low melting point filament component is in a range of from 160° C. to less than 240° C.

6. A woven belt as claimed in claim 1, wherein:
   the thread count of one of the first fiber bundle and the second fiber bundle per 1 inch relative to the other fiber bundle is set to 20 or less.

7. A woven belt as claimed in claim 1, wherein:
   at least either of said first fiber bundle and said second fiber bundle is fiber bundle of non-twisted yarns provided with interlaced portions.

8. A seat belt apparatus comprising:
   a woven belt for restraining an occupant;
   a retractor device capable of winding the woven belt;
   a buckle which is connected to a fixed side member; and
   a tongue which is attached to said woven belt and can be latched with said buckle, wherein
   said woven belt is made by weaving first fiber bundle(s) extending in one of substantially a longitudinal direction or a width direction of webbing and second fiber bundle(s) extending in the other of substantially the longitudinal direction and the width direction of the webbing,
   wherein the first fiber bundle contains a plurality of single yarns, the plurality of single yarns comprises a plurality of thermal adhesive yarns and a plurality of normal synthetic yarns, and
   wherein the plurality of thermal adhesive yarns are arranged to huddle to substantially a center of the first fiber bundle so that the plurality of normal synthetic yarns are positioned on opposite sides of the huddle of the plurality of thermal adhesive yarns.

* * * * *